(12) United States Patent
Kaga et al.

(10) Patent No.: US 7,908,039 B2
(45) Date of Patent: Mar. 15, 2011

(54) COOLING STORAGE CABINET AND METHOD OF OPERATING THE SAME

(75) Inventors: Shinichi Kaga, Toyoake (JP); Akihiko Hirano, Toyoake (JP)

(73) Assignee: Hoshizaki Denki Kabushiki Kaisha, Aichi (JP)

( * ) Notice: Subject to any disclaimer, the term of this patent is extended or adjusted under 35 U.S.C. 154(b) by 246 days.

(21) Appl. No.: 12/227,160

(22) PCT Filed: Apr. 10, 2007

(86) PCT No.: PCT/JP2007/057897
§ 371 (c)(1),
(2), (4) Date: Nov. 10, 2008

(87) PCT Pub. No.: WO2007/135815
PCT Pub. Date: Nov. 29, 2007

(65) Prior Publication Data
US 2009/0105884 A1    Apr. 23, 2009

(30) Foreign Application Priority Data
May 19, 2006    (JP) ................................. 2006-140301

(51) Int. Cl.
*G05D 23/00* (2006.01)
*G01M 1/38* (2006.01)
*G05B 13/00* (2006.01)
*G05B 15/00* (2006.01)
*G05D 23/32* (2006.01)

(52) U.S. Cl. ........ 700/299; 700/277; 700/278; 700/300; 62/157; 62/158; 62/159; 236/44 B; 236/91 R; 236/91 D

(58) Field of Classification Search .......... 700/276–278, 700/299–300; 62/157–159, 180–181, 203–205; 236/44, 91, 44 B, 91 R, 91 D
See application file for complete search history.

(56) References Cited

U.S. PATENT DOCUMENTS
3,747,361 A * 7/1973 Harbour .......................... 62/157
(Continued)

FOREIGN PATENT DOCUMENTS
JP        08-313079        11/1996
(Continued)

OTHER PUBLICATIONS
International Search Report mailed Jun. 12, 2007 for International Application No. PCT/JP2007/057897.
(Continued)

*Primary Examiner* — Ramesh B Patel
(74) *Attorney, Agent, or Firm* — Wenderoth, Lind & Ponack, L.L.P.

(57) ABSTRACT

A cooling device is provided with an inverter compressor. Set speeds of the inverter compressor can be switched to six stages from a first speed to a sixth speed. The relationship between each of the set speeds of the rotational speed is set so that the stages adjacent to each other have gradually larger differences in rotational speed as the rotational speed becomes higher. With this, independently from the level of the rotational speed, a degree of increase in cooling performance between each of the stages can be equalized. In a case of performing a control to increase or decrease the rotational speed of the inverter compressor stage by stage depending whether an actual temperature drop rate is larger or smaller than a target temperature drop rate, the change amounts in cooling performance that can be substantially equalized, and too high or too low cooling performance does not result, i.e. fluctuation in cooling performance can be minimized. Thus, control to drop the internal temperature in accordance with a predetermined cooling characteristic can be stably performed.

9 Claims, 17 Drawing Sheets

U.S. PATENT DOCUMENTS

| | | | | |
|---|---|---|---|---|
| 4,328,680 A | * | 5/1982 | Stamp et al. | 62/155 |
| 4,662,185 A | * | 5/1987 | Kobayashi et al. | 62/228.4 |
| 4,903,502 A | * | 2/1990 | Hanson et al. | 62/228.5 |
| 4,959,969 A | * | 10/1990 | Okamoto et al. | 62/157 |
| 5,460,009 A | * | 10/1995 | Wills et al. | 62/180 |
| 5,592,058 A | * | 1/1997 | Archer et al. | 318/400.09 |
| 6,216,478 B1 | * | 4/2001 | Kang | 62/228.4 |
| 6,931,872 B2 | * | 8/2005 | Kaga et al. | 62/228.4 |
| 7,442,012 B2 | * | 10/2008 | Moens | 417/32 |
| 7,730,732 B2 | * | 6/2010 | Kaga et al. | 62/228.4 |
| 2002/0116936 A1 | * | 8/2002 | Cartwright et al. | 62/157 |
| 2003/0070438 A1 | * | 4/2003 | Kikuchi et al. | 62/141 |
| 2003/0182957 A1 | * | 10/2003 | Hu et al. | 62/228.4 |
| 2007/0144188 A1 | * | 6/2007 | Kaga et al. | 62/157 |
| 2008/0295531 A1 | * | 12/2008 | Song et al. | 62/157 |
| 2009/0171512 A1 | * | 7/2009 | Duncan | 700/300 |
| 2009/0216379 A1 | * | 8/2009 | Smith | 700/275 |

FOREIGN PATENT DOCUMENTS

| | | |
|---|---|---|
| JP | 09-152200 | 6/1997 |
| JP | 11-304329 | 11/1999 |
| JP | 2000-130867 | 5/2000 |
| JP | 2005-121341 | 5/2005 |
| JP | 2005-265267 | 9/2005 |
| SG | 71208 | 3/2000 |

OTHER PUBLICATIONS

Supplementary European Search Report dated Jun. 29, 2010 in corresponding European Application No. 07741333.4.

* cited by examiner

FIG.7

| SET SPEED | ROTATIONAL SPEED (r/sec) |
|---|---|
| FIRST SPEED | 25 |
| SECOND SPEED | 30 |
| THIRD SPEED | 37 |
| FOURTH SPEED | 47 |
| FIFTH SPEED | 60 |
| SIXTH SPEED | 75 |

FIG.13

| INTERNAL TEMPERATURE (°C) | TARGET TEMPERATURE DROP RATE Ap2(ΔT/Δt) |
|---|---|
| 30 | ·········· |
| ··· | ·········· |
| ··· | ·········· |
| . . . | . . . |

FIG.14

| INTERNAL TEMPERATURE (°C) | TARGET TEMPERATURE DROP RATE Ac2(ΔT/Δt) |
|---|---|
| . | . |
| (UPPER LIMIT TEMPERATURE) | · · · · · · · · · |
| . . | . . |
| (SET TEMPERATURE) | · · · · · · · · · |
| . . | . . |
| (LOWER LIMIT TEMPERATURE) | · · · · · · · · · |
| . | . |

FIG.16

| SET SPEED | ROTATIONAL SPEED (r/sec) |
|---|---|
| FIRST SPEED | 25 |
| SECOND SPEED | 35 |
| THIRD SPEED | 45 |
| FOURTH SPEED | 55 |
| FIFTH SPEED | 65 |
| SIXTH SPEED | 75 |

COOLING STORAGE CABINET AND METHOD OF OPERATING THE SAME

BACKGROUND OF THE INVENTION

I. Technical Field

The present invention relates to a cooling storage cabinet having an inverter compressor and an operating method thereof.

II. Description of the Related Art

In recent years, refrigerators, such as for commercial use, and having inverter compressors, have become widely used. The inverter compressor can perform speed control. By using the inverter compressor, there are many advantages, one of which is higher efficiency in performing control cooling. That is, in a case of performing control cooling to maintain an inside of the refrigerator around a set temperature, rotational speed (revolution number per unit time) of the inverter compressor is controlled to be reduced stage by stage in the vicinity of the set temperature. By adopting this control method, a continuous ON time of the compressor becomes much longer; in other words, the number of switching between ON and OFF is considerably reduced. Furthermore, the compressor is driven at a lower rotation. Therefore, higher efficiency and energy conservation can be attempted.

Specifically, the applicant of the present application proposed an operating method as disclosed in Japanese Unexamined Patent Application Publication No. 2005-121341. This method is as follows. The rotational speed of the inverter compressor can be changed to a plurality of stages. A cooling characteristic that shows a target time-varying change mode of internal temperature drop is prestored as data in a storage means or device. At every predetermined sampling time, a target internal temperature drop rate based on the cooling characteristic is compared with an actual internal temperature drop rate calculated based on a value detected by an internal temperature sensor. In a case where the actual temperature drop rate is lower than the target temperature drop rate, the rotational speed of the inverter compressor is increased by one stage. In a case where the actual temperature drop rate is higher than the target temperature drop rate, the rotational speed of the inverter compressor is decreased by one stage. Thus, the internal temperature is controlled to be dropped in accordance with the prestored cooling characteristic.

SUMMARY OF THE INVENTION

Problem to be Solved by the Invention

With the known art, supposing that the set speed of the inverter compressor can be switched to six stages from a first speed to a sixth speed, the rotational speeds (r/sec: revolution number per second) of the set speeds each are arranged at, for example, from 25 to 75 (r/sec) as shown in FIG. 16. Specifically, adjacent stages were set at equal differences in rotational speed of a degree of 10 (r/sec).

With such a setting, it was found that, where conditions such as area of a condenser and air flow rate of a condenser fan and area of an evaporator and air flow rate of an evaporator fan are constant, the relationship between the rotational speeds of the inverter compressor and the cooling performance (W) are as shown in FIG. 17. Namely, the higher is the rotational speed, the less is the degree of increase in cooling performance. The reason for this is considered to be as follows. Where the rotational speed of the compressor is raised, the temperature of the evaporator drops and, on the other hand, the temperature of the condenser rises. Here, if the condensing capacity such as the air volume of the condenser fan is not changed, dissipation of heat from the condenser is limited, and therefore absorption of heat by the evaporator is difficult. As a result, the cooling performance becomes lower. In this regard, if the condensing capacity is changed and thereby the temperature of the condenser is kept constant, the degrees of increase in cooling performance can be substantially equalized independently from the level of the rotational speed of the compressor.

Thus, where the degree of increase and decrease in cooling performance between each of the stages is different depending on the level of the rotational speed of the inverter compressor, there is a concern that a too high or too low cooling performance results (as explained above) in the case of performing the control to increase or decrease the rotational speed of the inverter compressor stage by stage depending on whether the actual temperature drop rate is higher or lower than the target temperature drop rate, and, because of the too high or too low cooling speed, the control to drop the temperature according to the predetermined cooling characteristic cannot be stably executed.

The present invention was completed based on the circumstances above, and its purpose is to perform stable cooling control.

A method of operating a cooling storage cabinet, wherein a cooling device for internal cooling includes a compressor. The compressor is an inverter compressor. A rotational speed of the inverter compressor can be changed between a plurality of stages. The method includes: prestoring a cooling characteristic as data, the cooling characteristic showing a time-varying change of a predetermined physical amount, the physical amount corresponding to a target time-varying drop of internal temperature; detecting the physical amount at every predetermined sampling time; and based on the detected value, increasing or decreasing the rotational speed of the inverter compressor stage by stage so that the physical amount is changed in accordance with the target cooling characteristic. The method is characterized in that the rotational speeds of the inverter compressor in each stage are set so that the adjacent stages have gradually larger differences in rotational speed as the rotational speed becomes higher.

An inside of the cooling storage cabinet is cooled by a cooling device. The cooling device includes a compressor and an evaporator. The compressor is an inverter compressor. The rotational speed of the inverter compressor can be changed to a plurality of stages. The cooling storage cabinet includes: a storing means or device that stores a target cooling characteristic as data, the cooling characteristic showing a time-varying change of a predetermined physical amount, the physical amount corresponding to a time-varying drop of an internal temperature; a physical amount sensor that detects the physical amount; a physical amount change rate calculating section that calculates a change rate of the physical amount at every predetermined sampling time and based on a signal of the physical amount sensor; a target physical amount change rate output section that outputs a target change rate based on the cooling characteristic at every sampling time, the cooling characteristic being stored in the storing means or device, the target change rate being a rate in the physical amount at the sampling time; and a comparing section that compares an actual physical amount change rate with the target physical amount change rate, the actual physical amount change rate being calculated in the physical amount change rate calculation section, the target physical amount change rate being outputted from the target physical amount change rate output section. Based on a result of the comparison performed by the comparing section, in a case where the actual physical amount change rate is lower than the target physical amount change rate, the rotational speed of the inverter compressor is increased by one stage, and in a case where the actual physical amount change rate is higher than the target physical amount change rate, the rotational speed of the inverter compressor is decreased by one stage. The cooling storage cabinet is characterized in that rotational speeds of the inverter compressor in each stage are set so that the adjacent stages have gradually larger differences in rotational speed as the rotational speed is higher. Here, the physical amount change degree is defined as a change amount of a physical amount per unit time, which is the same also in the configurations below.

With the above configuration, the rotational speed in each of the stages of the inverter compressor is set so that adjacent stages have gradually larger differences in rotational speed as the rotational speed is higher. That is, based on a knowledge that the higher the rotational speed, the degree of increase in cooling performance between the stages becomes less, and anticipating the short increase in cooling performance, the adjacent stages are arranged at gradually larger differences in rotational speed as the rotational speed is higher. With this, independently from the level of the rotational speed, the degrees of increase in cooling performance between the stages can be substantially equalized.

Therefore, in the case of performing the control to increase or decrease the rotational speed of the inverter compressor stage by stage so that the physical amount is changed in accordance with the target cooling characteristic, the change amounts in cooling performance can be a substantially equalized amount without causing too high or too low cooling performance, i.e. up-and-down of the cooling speed can be minimized. Thus, the control to change the physical amount in accordance with the predetermined cooling characteristic can be stably performed.

The configurations may be as follows.

The cooling characteristic is represented by a linear function of physical amount and time, and the target physical amount change rate output section is arranged to output the target physical amount change rate as a fixed value. With the configuration, the physical amount changing degree is fixed independently from time variation, and each-time calculation is unnecessary. Therefore, the control system can be simplified.

The cooling characteristic is represented by a quadratic function of physical amount and time, and the target physical amount change rate output section includes a function to perform calculation of the physical amount change rate in the physical amount and output a calculated value as the target physical amount change rate. The calculation is performed at every sampling time and based on the quadratic function. With this configuration, the cooling characteristic is represented as a quadratic function of the physical amount and time. The target physical amount change degree is calculated as the change amount of the physical amount per unit time for the physical amount from the quadratic function at every sampling time.

The cooling storage cabinet includes a reference table that is prepared in advance based on the cooling characteristic. The reference table refers the physical amount to the target physical amount change rate. The target physical amount change rate output section includes a function to search and output the target physical amount change rate that corresponds to the physical amount at the moment through the reference table. With this configuration, the target physical amount change degree of the physical amount at the moment is searched through the prepared reference table at every sampling time, and outputted. Since it is necessary only to refer to the reference table in order to obtain the target physical amount change degree, and calculation is unnecessary, the control speed can be increased.

The cooling storage cabinet includes a plurality of kinds of programs. The programs are to change the rotational speed of the inverter compressor so that the physical amount is changed in accordance with a predetermined cooling characteristic. The kinds of programs are different from each other in cooling characteristic and the like. Each of the programs are selectively executably stored in a control means or device attached to the cooling device. In a case where the cooling storage is practically used, there is a case where the ideal cooling mode is different depending on conditions such as installation location, frequency of opening and closing the door, and the kind of stored food. Therefore, by preparing a plurality of kinds of programs that differ from each other in characteristic in each cooling and the like, and by selectively executing the programs depending on the use conditions, the most preferable cooling that meets the use conditions can be performed.

Effect of the Invention

In accordance with the present invention, control of the internal temperature drop over time can be stably performed. Furthermore, it is necessary only to change the setting of the rotational speed of the inverter compressor. Therefore, it can be easily realized.

BRIEF DESCRIPTION OF THE DRAWINGS

FIG. 7 is a table figure showing a relationship between set speeds and rotational speeds of the inverter compressor;

FIG. 13 is a figure showing a reference table based on a pull-down-cooling characteristic of a third embodiment;

FIG. 14 is a figure showing a reference table based on a control-cooling characteristic;

FIG. 16 is a table showing a relationship between set speeds and rotational speeds of an illustrative known inverter compressor.

DETAILED DESCRIPTION OF THE INVENTION

Embodiments will now be explained referring to attached drawings. The present invention is applied to a freezer-refrigerator for commercial use.

First Embodiment

A first embodiment in accordance with the present invention will be explained with reference to FIGS. 1 through 10.

Figure 1:
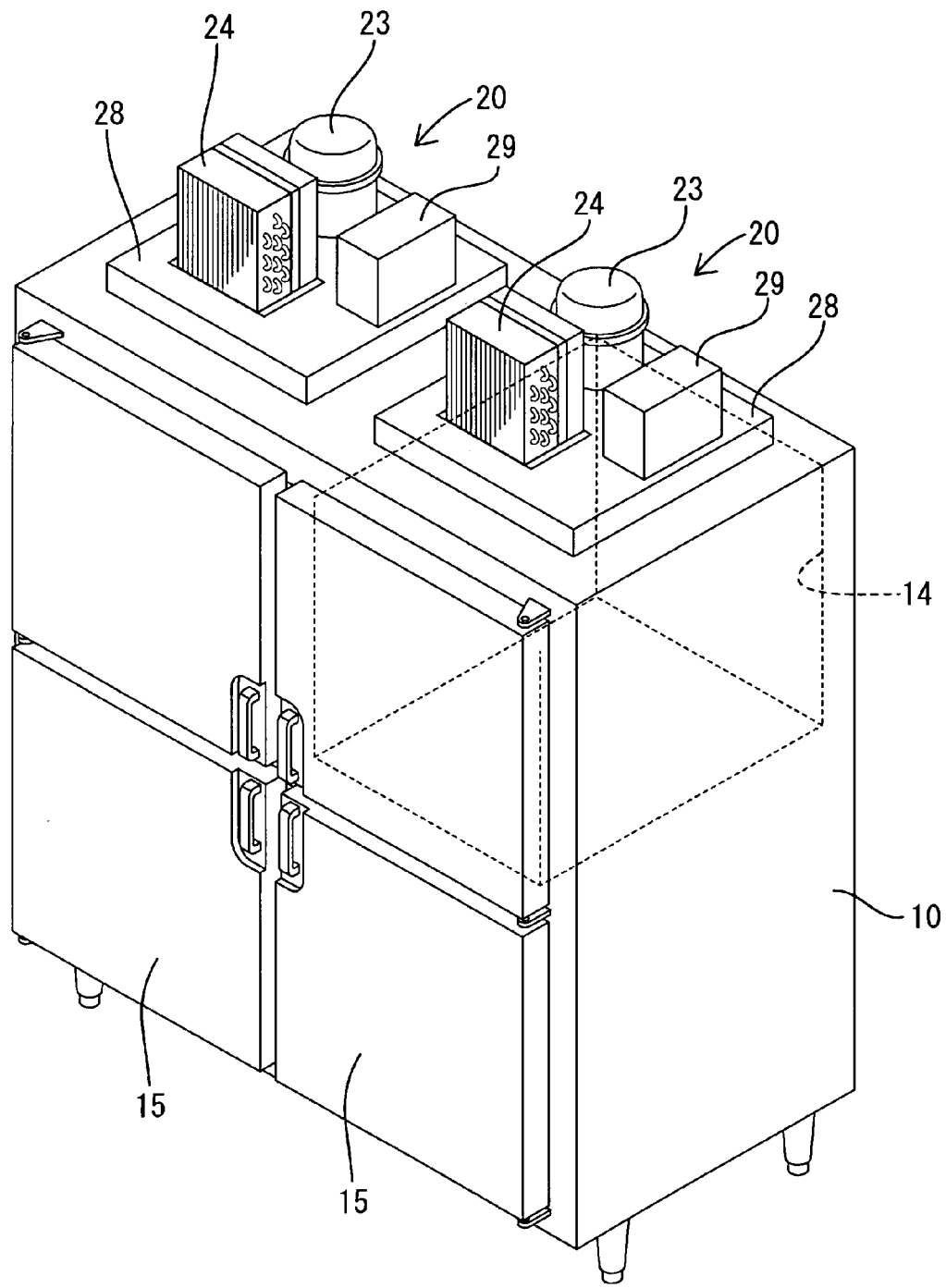
FIG. 1 is a perspective view of a freezer-refrigerator of a first embodiment in accordance with the present invention.

The freezer-refrigerator is of a four-door type and, as shown in FIG. 1, is provided with a body 10 including a heat-insulating box body having a front opening. The front opening is partitioned with a cruciate partition frame and thereby four openings 11 are defined. A substantially quarter inner space that corresponds to an upper right opening 11 as viewed from the front is partitioned with heat-insulating partition walls and thereby is arranged as a freezing compartment 14. The remaining three quarters areas are arranged as refrigerating compartments 13. Each of the openings 11 has a heat-insulating door 15 mounted thereto so as to pivotally open and close.

A machine compartment 18 is configured on the top of the body 10 by panels 17 (see FIG. 3) planted around the top of the body 10. The top of the body 10 serves as a bottom of the machine compartment 18. Square openings 19 are formed in the top of the body 10. The openings 19 are equal in size. Each of the openings 19 corresponds to respective one of a ceiling of the refrigerating compartment 13 and a ceiling of the freezing compartment 14. Cooling units 20 are individually mounted to the respective openings 19.

Figure 2:
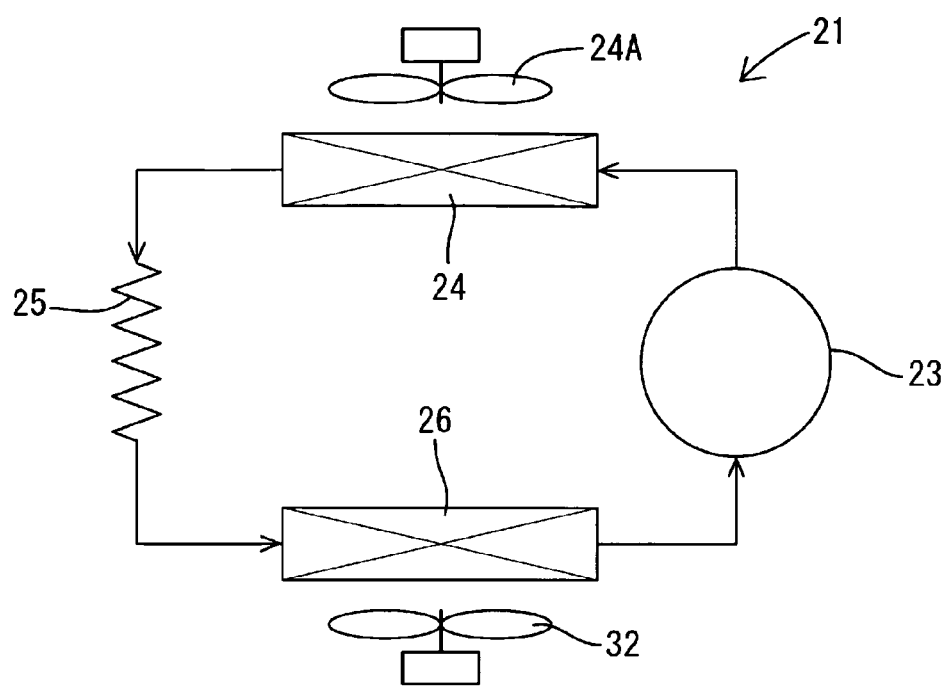
FIG. 2 is a diagram of a freezing circuit.

As shown in FIG. 2, the each cooling unit 20 includes a freezing circuit 21. The freezing circuit 21 is configured using coolant piping by circulatingly connecting a compressor 23, a condenser 24 having a condenser fan 24A, a capillary tube 25, and an evaporator 26. Furthermore, heat-insulating unit bases 28 are provided to close over the above explained openings 19. The evaporator 26, which is one of the components of the cooling unit 20, is mounted below the unit base 28. The other components are mounted on or above the unit base 28.

Figure 3:
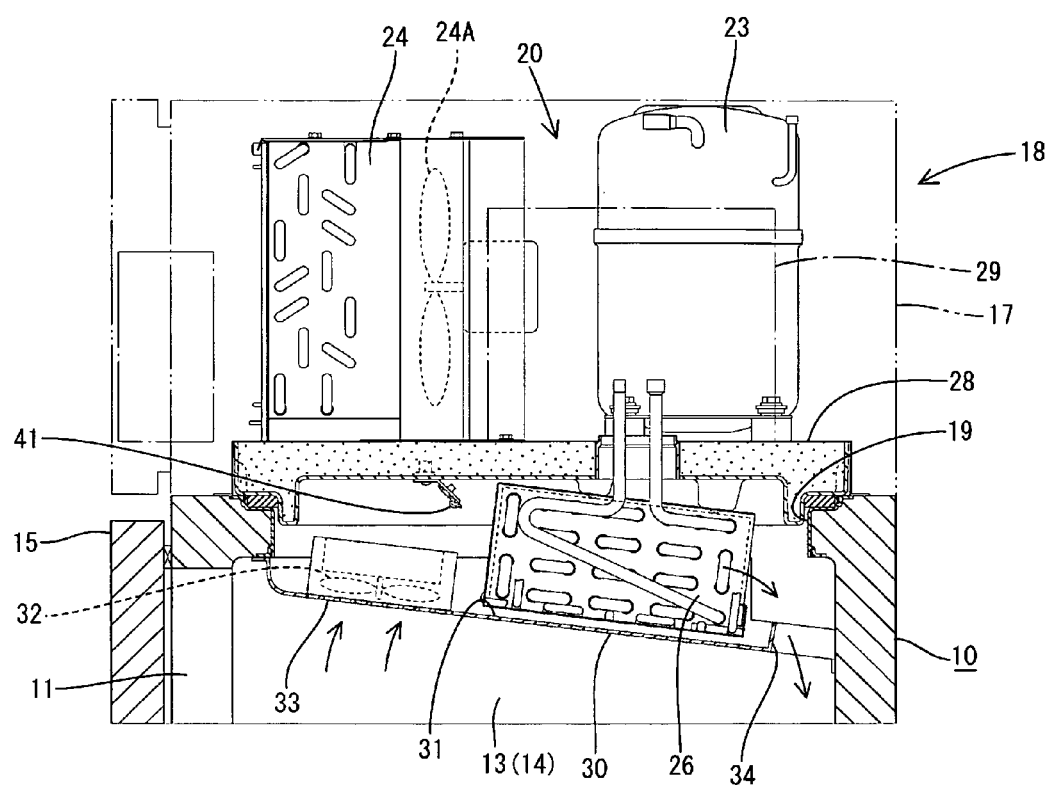
FIG. 3 is a partial cross-sectional view in a state where a cooling unit is mounted.

On the other hand, as shown in FIG. 3, a drain pan 30, which serves also as a cooling duct, is attached over the ceiling portion of each of the refrigerating compartment 13 and the freezing compartment 14. The drain pan 30 is inclined downwardly toward the rear side. A cooling chamber 31 is thus defined between the drain pan 30 and the unit base 28. An inlet 33 is provided in an upper side of the drain pan 30. A cooling fan 32 is mounted on the upper side of the drain pan 30. An outlet 34 is formed in a lower side of the drain pan 30.

Essentially, when the cooling unit 20 and the cooling fan 32 are activated, air in the refrigerating compartment 13 (the freezing compartment 14) is drawn from the inlet 33 into the cooling chamber 31, as shown by arrows in the same figure. While the air passes through the evaporator 26, cold air is generated by heat exchange. The cold air is then blown from the outlet 34 into the refrigerating compartment 13 (the freezing compartment 14). By the circulation of air, the refrigerating compartment 13 (the freezing compartment 14) is cooled.

Note that, in the present embodiment, it is intended to make each of the cooling units 20 uniform, each mounted to the refrigerating compartment 13 and the freezing compartment 14. While cooling performance of the cooling unit 20 depends on a capacity of the compressor 23, the required cooling performance differs depending on conditions such as a distinction between refrigeration and freezing or the size of the internal volume. Therefore, an inverter compressor 23 (hereinafter referred to as the compressor 23 at discretion) is adopted as the compressor 23. The adopted inverter compressor 23 has a required maximal volume, and its rotational speed can be controlled. Furthermore, the capillary tubes 25 are also made uniform. The adopted type of the capillary tubes 25 has an intermediate flow characteristic between for refrigerating and for freezing, which detailed explanation is omitted.

Thus, structurally, the cooling unit 20 is uniform for refrigerating and freezing and, on the other hand, the operation control is separately performed. This is based on a knowledge that, in a case of standardizing the cooling unit 20, there is a concern that a temperature characteristic in, for example, pull-down cooling may be largely different depending on the conditions such as the distinction between refrigerating and freezing or the size of the heat-insulating box body (the internal volume).

Considering a case where doors of the freezer-refrigerator for commercial use such as of the present embodiment is frequently opened and closed for bringing in and out food, and where the ambient air temperature is rather high, the internal temperature tends to increase. It is necessary to consider temperature drop as a restoring force in the case, i.e. a pull-down cooling characteristic. Therefore, a performance test in the pull-down cooling is indispensable. However, since the cooling speed largely depends on the heat-insulating box body as mentioned above, it is necessary to perform the performance test in a state where the cooling unit 20 and the mounting heat-insulating box body are assembled. Therefore, even where the cooling unit 20 is uniform, complication in the performance test cannot be avoided. Therefore, a means or device for controlling the internal temperature along a predetermined temperature curve in the pull-down cooling without depending on the heat-insulating box body is proposed in this embodiment.

Furthermore, after the pull-down cooling as mentioned above, control cooling to maintain the internal temperature around a predetermined set temperature is executed both in refrigerating and freezing. Since the inverter compressor 23 is provided as explained above, such advantages as follows can be obtained. Namely, in performing the control cooling, if the speed (the revolution number) of the inverter compressor 23 is controlled in the vicinity of the set temperature so as to be decreased stage by stage, the temperature drops very slowly. Therefore, a continuous ON time of the compressor 23 becomes much longer, i.e. the number of switching between ON and OFF is considerably reduced. Furthermore, the compressor is driven at a lower rotation. Therefore, higher efficiency and energy conservation can be realized.

Therefore, similar to the operation in the pull-down cooling as explained above, the operation of the inverter compressor 23 in the control cooling also is controlled so that the internal temperature is along an ideal temperature curve.

Figure 4:
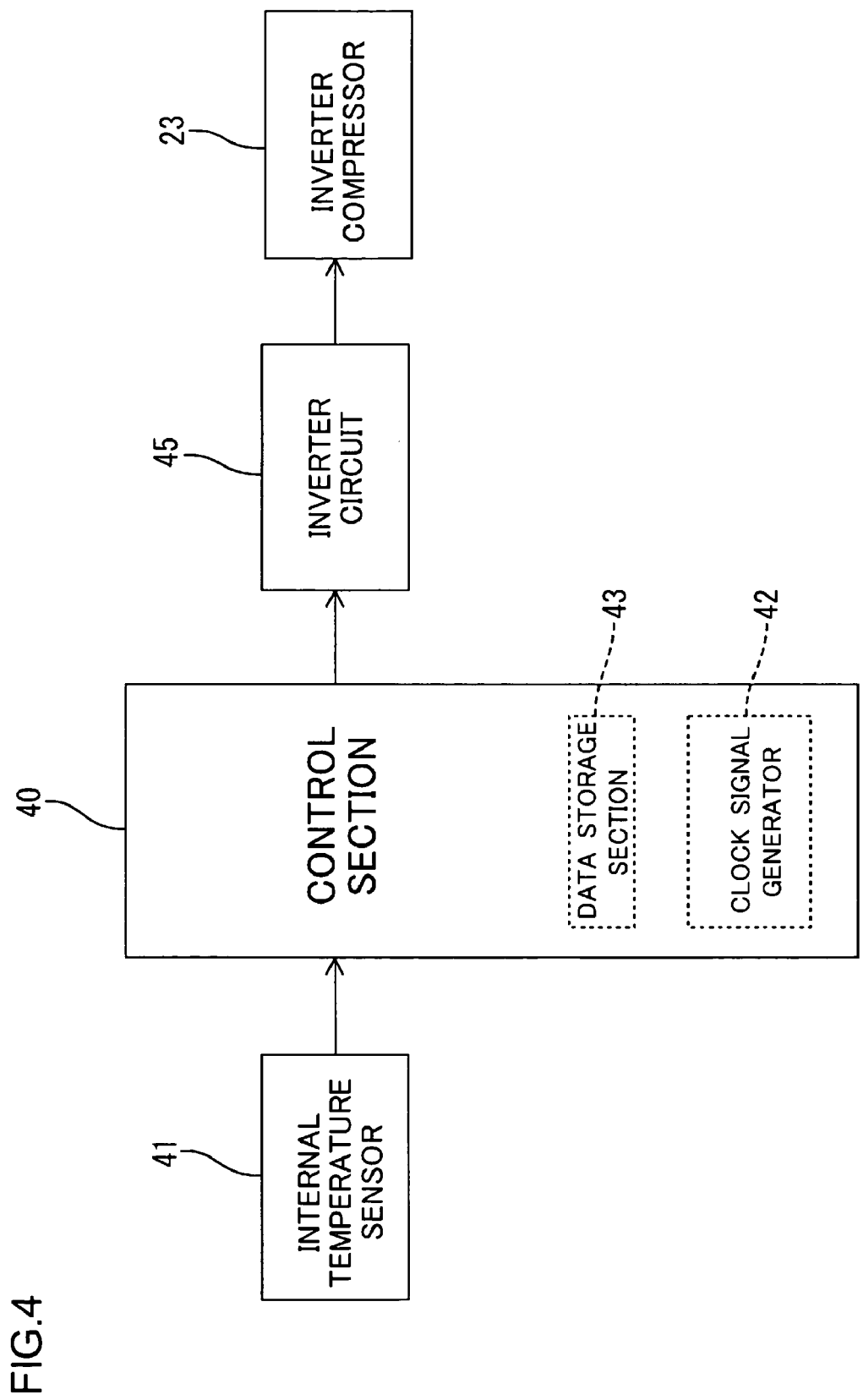
FIG. 4 is a block diagram of a control mechanism of an inverter compressor.

For this purpose, a control section 40 is provided and is accommodated in an electric component box 29 as shown in FIG. 4. The control section 40 has a microcomputer and the like and executes a predetermined program. The electric component box 29 is disposed on the top of the unit base 28. On the unit base 28, the above-explained cooling unit 20 is mounted. Connected to an input side of the control section 40 is an internal temperature sensor 41 that detects the internal temperature.

Figure 5:
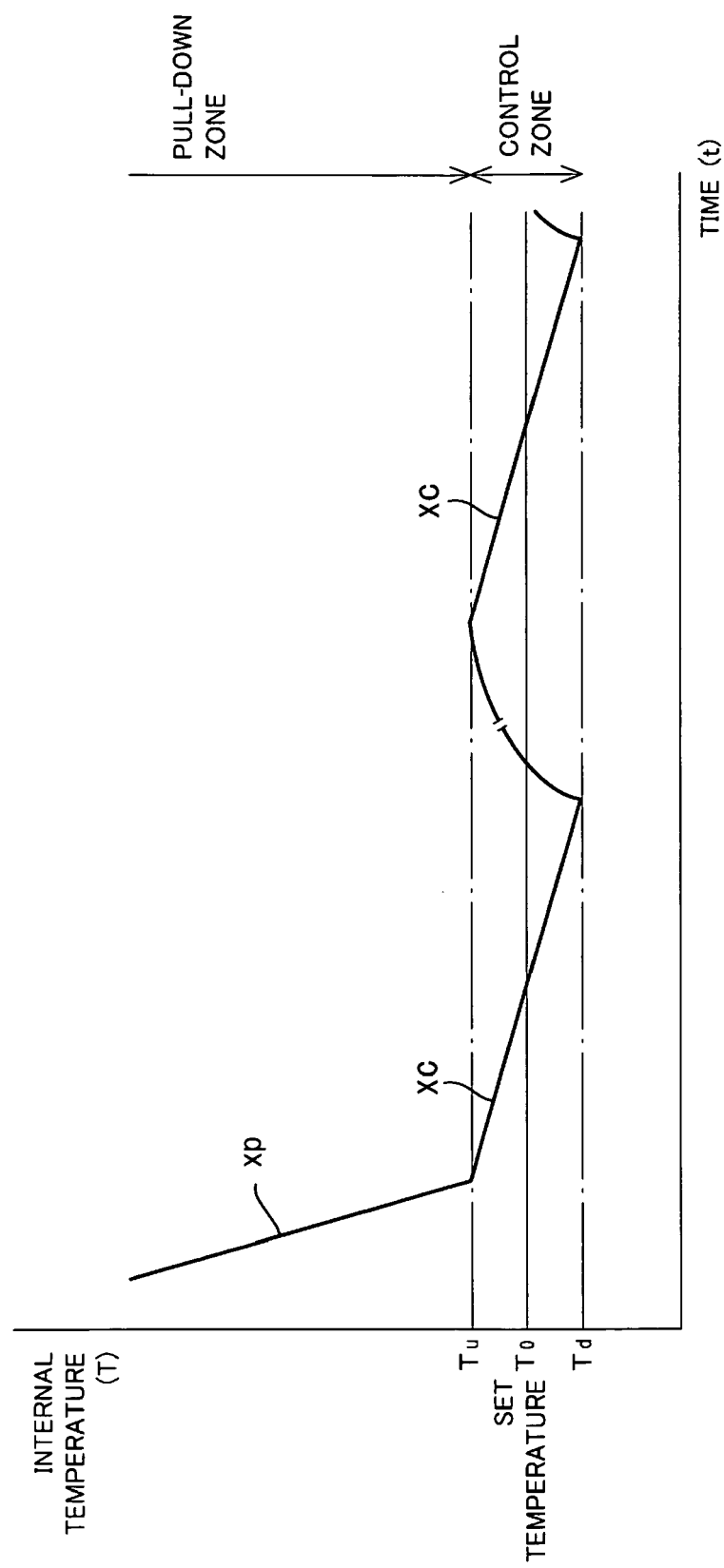
FIG. 5 is a graph showing a cooling characteristic.
Figure 6:
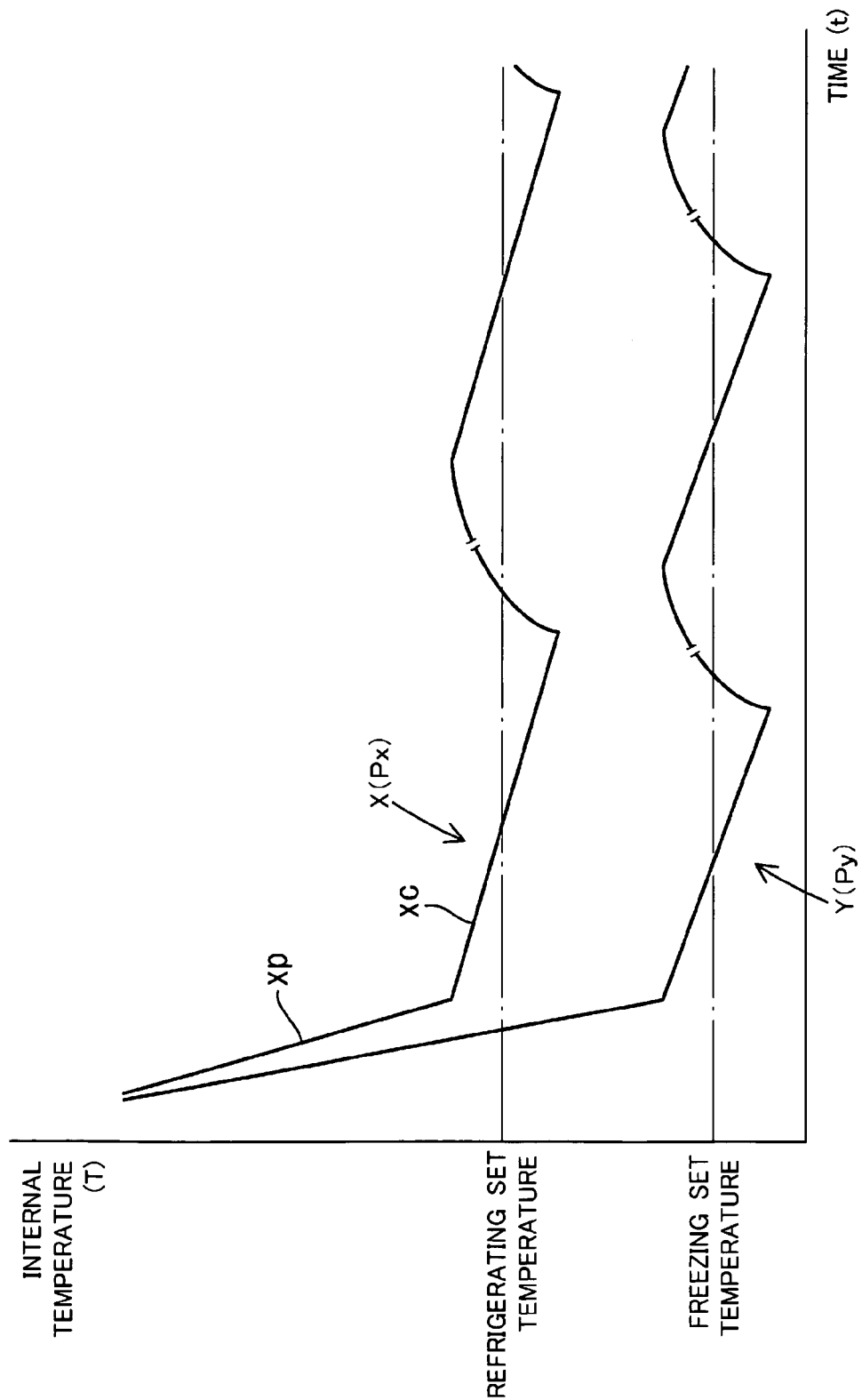
FIG. 6 is a graph comparatively showing internal temperature characteristics for a refrigerating side and for a freezing side.
Figure 8:
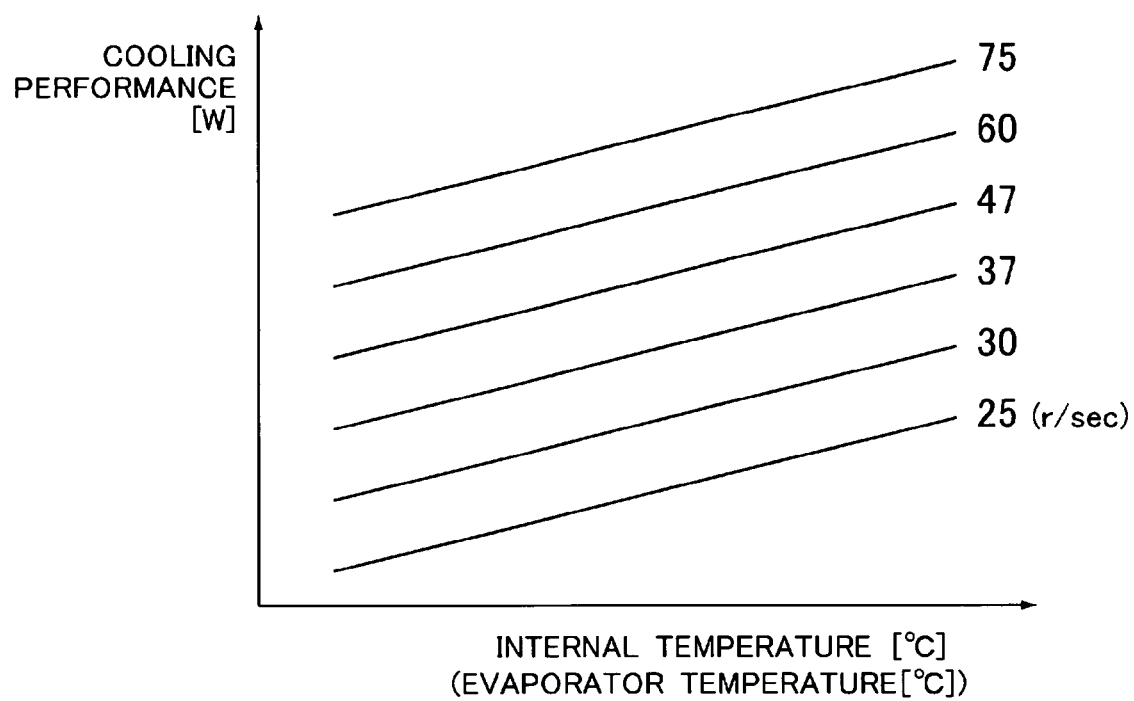
FIG. 8 is a graph showing a relationship between the rotational speeds and cooling performance of the inverter compressor.

The control section 40 includes a clock signal generator 42 and a data storage section 43. Selected and stored in the data storage section 43 is, first, a straight line xp of a linear function as the ideal temperature curve in pull-down cooling, as shown in FIG. 5. In a case where the ideal curve is a straight line xp, a target internal temperature drop rate (a temperature drop amount per unit time: $\Delta T/\Delta t$) is determined as a fixed value Ap independently from the internal temperature.

In the data storage section 43, the ideal temperature curve in the control cooling is also stored. The temperature curve is, for example as shown in the same figure, set as a straight line xc having a gentler incline in comparison with the ideal curve (the straight line xp) in the pull-down cooling. The target internal temperature drop rate Ac of the ideal curve xc also is a fixed value, but is a smaller value than the target temperature drop rate Ap of the ideal curve xp.

In other words, in the refrigerating side for example, an operation program Px (a refrigerating program Px) is provided. With the operation program Px, operation of the inverter compressor 23 is controlled so that the inside of the compartments follows a temperature characteristic X including the ideal curves xp, xc (see FIG. 6) in the pull-down cooling and the control cooling.

On the other hand, in the freezing side, while the essential control operation is the same, the internal set temperature is different, and the ideal curve itself is consequently different. Therefore, in the freezing side, an operation program Py (a freezing program Py) is necessary. With the operation program Py, operation of the inverter compressor 23 is controlled so that the inside of the compartment follows a temperature characteristic Y, for example, in the same figure.

Each of the cooling unit 20 has the electric component box 29 attached thereto as already explained and is provided with the control section 40. Both of the refrigerating program Px and the freezing program Py as explained above are stored in each cooling unit 20. Each of the refrigerating program Px and the freezing program Py accompanies data of the ideal curve.

Furthermore, an output side of the control section 40 is connected to the inverter compressor 23 through an inverter circuit 45. Here, set speeds of the inverter compressor 23 can be switched to six stages from a first to a sixth speed. The relationship between each of the set speeds and the rotational speeds (r/sec: revolution number per second) is arranged so that, as shown in FIG. 7, the first to sixth speeds correspond to "25", "30", "37", "47", "60", and "75", respectively.

Note here that the adjacent stages (set speeds) are arranged at differences of "5", "7", "10", "13", and "15" in rotational speed (r/sec). That is, the rotational speed in each of the stages is set so that the adjacent stages have gradually larger differences in rotational speed as the rotational speed is higher.

Figure 17:
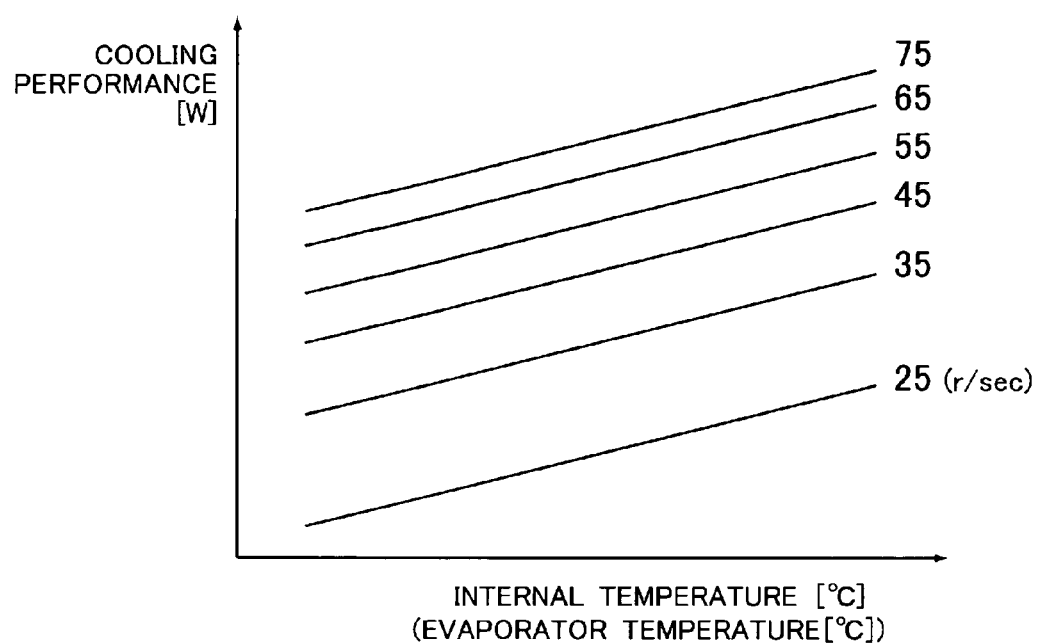
FIG. 17 is a graph showing a relationship between the rotational speeds and cooling performance of the inverter compressor.

This is based on the knowledge as already explained with reference to FIG. 17 that, for example, supposing that the differences in rotational speed between the adjacent stages are equal, the higher the rotational speed, the less the degree of increase in cooling performance is between the stages. Therefore, anticipating the short increase in cooling performance, the adjacent stages are arranged at gradually larger differences in rotational speed as the rotational speed is higher. With this, independently from the level of the rotational speed, the degrees of increase in cooling performance between the stages can be substantially equalized.

Operations of this embodiment are as follows.

The body 10 including the heat-insulating box body and the uniformed two cooling units 20 are separately carried to an installation place, and each are mounted in the openings 19 of the ceiling of the refrigerating compartment 13 and of the ceiling of freezing compartment 14. The internal set temperature is then inputted for each of the refrigerating compartment 13 and the freezing compartment 14. Along with this, in the control section 40 attached to the cooling unit 20 mounted to the refrigerating compartment 13 side, the refrigerating program Px is selected with an unillustrated switch provided in the electric component box 29. On the other hand, in the control section 40 attached to the cooling unit 20 mounted to the freezing compartment 14 side, the freezing program Py is selected.

Thus, the cooling control for the refrigerating compartment 13 and the cooling control for freezing compartment 14 are performed each based on the respective individual operation programs Px, Py.

Figure 9:
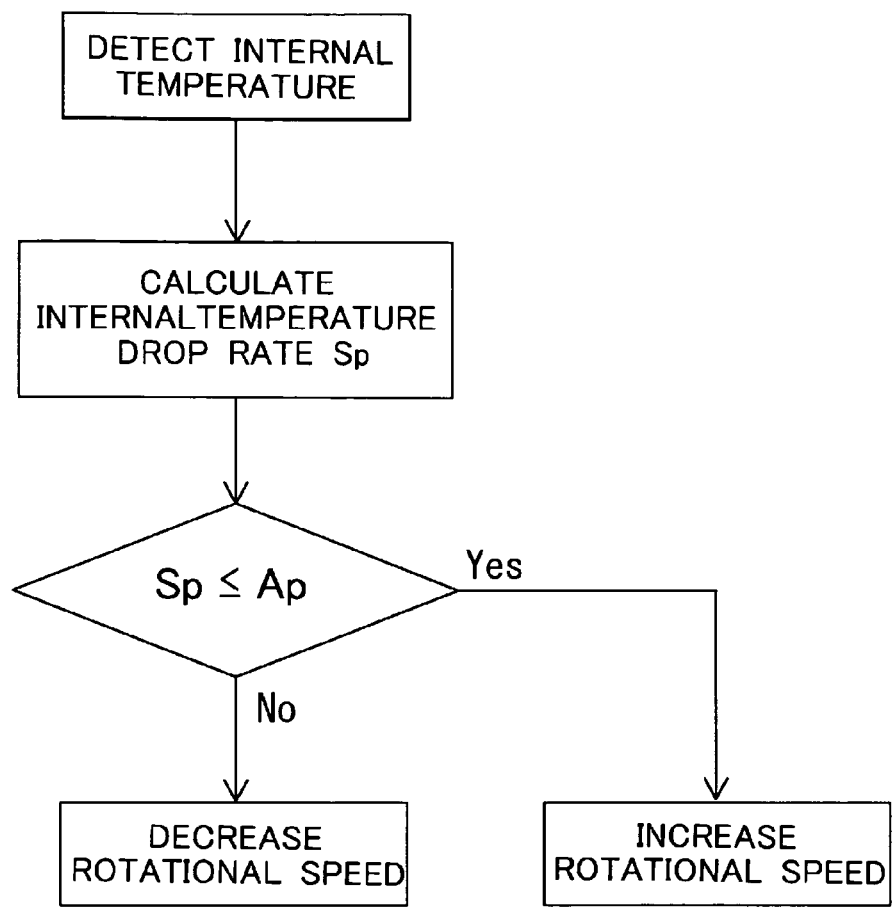
FIG. 9 is a flowchart showing a control operation of the inverter compressor in a pull-down zone.

Explanation concerning the refrigerating compartment 13 is as follows. At a point where the internal temperature exceeds the set temperature by equal to or more than a predetermined value, the pull-down control is started, and the internal temperature is detected at every predetermined sampling time. Based on the detected internal temperature, as shown in FIG. 9, at every sampling time, an actual temperature drop rate Sp is calculated. The calculated value Sp is compared with the target value Ap (fixed) that is read out from the data storage section 43. When the calculated value Sp is equal to or smaller than the target value Ap, the rotational speed of the inverter compressor 23 is increased by one stage through the inverter circuit 45. Alternatively, when the calculated value Sp is greater than the target value Ap, the rotational speed of the compressor 23 is decreased by one stage. This is repeated at every predetermined sampling time. The pull-down cooling is thus performed along the ideal curve (the straight line xp) as shown in FIG. 5.

Figure 10:
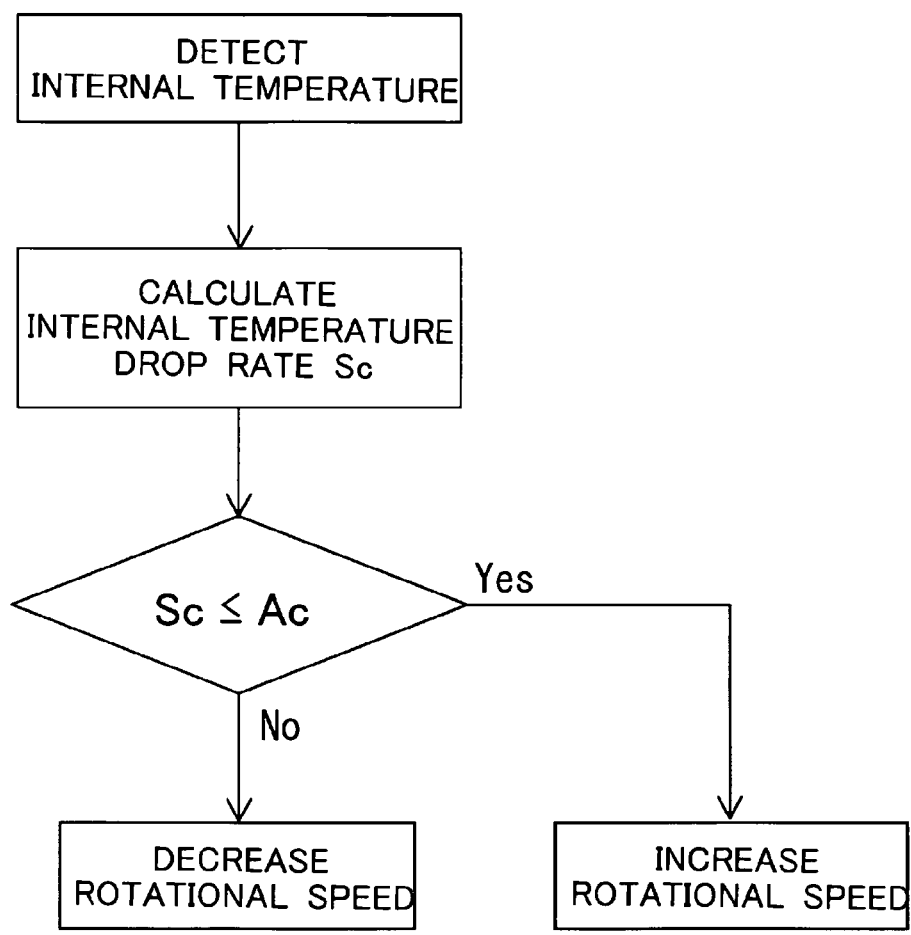
FIG. 10 is a flowchart showing a control operation of the inverter compressor in a control zone.

When the internal temperature is dropped by the above-explained pull-down cooling to an upper limit temperature Tu that is higher by a predetermined value than a set temperature To, it is shifted to the control cooling. The control operation of the control cooling is essentially the same with the operation in the pull-down cooling. That is, as shown in FIG. 10, the internal temperature is detected at every predetermined sampling time, and based on the detected internal temperature, an actual internal temperature drop rate Sc is calculated. Then, the calculated value Sc is compared with the target value Ac (fixed) of the internal temperature drop rate in the ideal temperature curve xc. When the calculated value Sc is equal to or smaller than the target value Ac, the rotational speed of the inverter compressor 23 is increased by one stage. Alternatively, when the calculated value Sc is greater than the target value Ac, the rotational speed of the compressor is decreased by one stage. This is repeated at every predetermined sampling time. The temperature is thus slowly dropped along the ideal curve (the straight line xc).

When the internal temperature is dropped to a lower limit temperature Td that is lower by a predetermined value than the set temperature To, the inverter compressor 23 is OFF, and the internal temperature slowly increases. When the internal temperature returns to the upper limit temperature Tu, the temperature control along the temperature curve xc is again performed. By repeating this, the inside is maintained substantially at the set temperature To.

Note that, also in the freezing compartment 14 side, pull-down cooling and control cooling are likewise performed.

With this embodiment, as explained above, the rotational speed in each of the stages of the inverter compressor 23 is set so that the adjacent stages have gradually larger differences in rotational speed as the rotational speed is higher. The degrees of increase in cooling performance between each of the stages thus can be substantially equalized.

Consequently, in a case of performing a control to increase or decrease the rotational speed of the inverter compressor 23 stage by stage depends on whether the actual temperature drop rate is higher or lower than the target temperature drop rate, the change amounts in cooling performance that can be substantially equalized, and too high or too low cooling performance does not result (i.e. up-and-down of the cooling speed can be minimized). Thus, the control to drop the internal temperature in accordance with the predetermined cooling characteristic can be stably performed. Besides, since it is necessary only to change the setting of the rotational speeds of the inverter compressor 23, it can be easily realized.

Note that, in this embodiment, the straight lines xp, xc of the linear function are selected as the ideal temperature curves in the control cooling and in the pull-down cooling. Therefore, the target temperature drop rates Ap, Ac are fixed independently from the internal temperature, and each time calculation is unnecessary, thus simplifying the control system.

Furthermore, in a case where the cooling storage is practically used, there is a case where the ideal cooling modes in the pull-down cooling and the control cooling are different depending on conditions such as installation location, frequency of opening and closing the door 15, and kind of stored food. Therefore, by preparing a plurality of kinds of programs that differ from each other in characteristic in cooling and the like, and by selectively executing the programs depending on the use conditions, the most preferable cooling that meets the use conditions can be performed.

Second Embodiment

Figure 11:
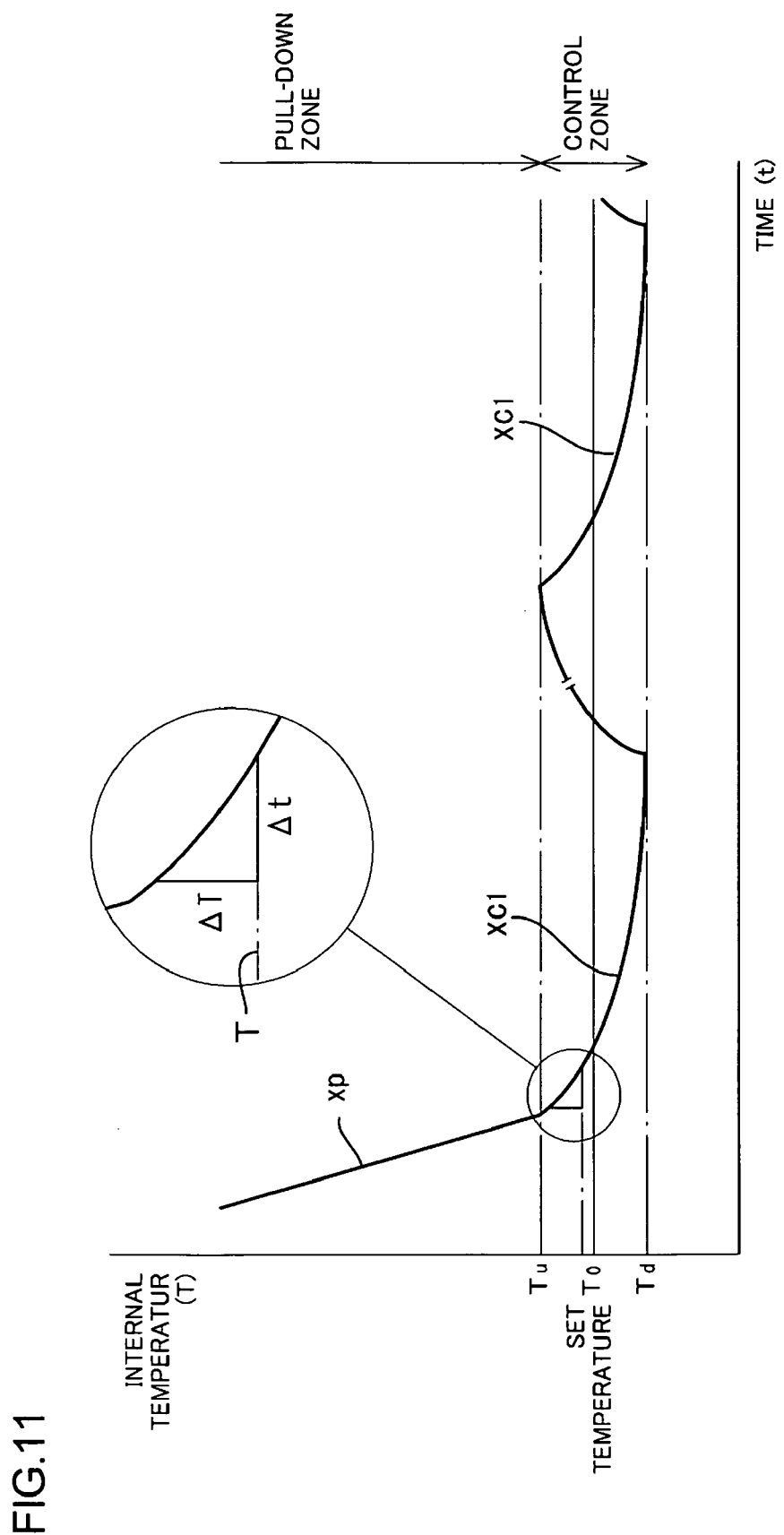
FIG. 11 is a graph showing a cooling characteristic of a second embodiment.
Figure 12:
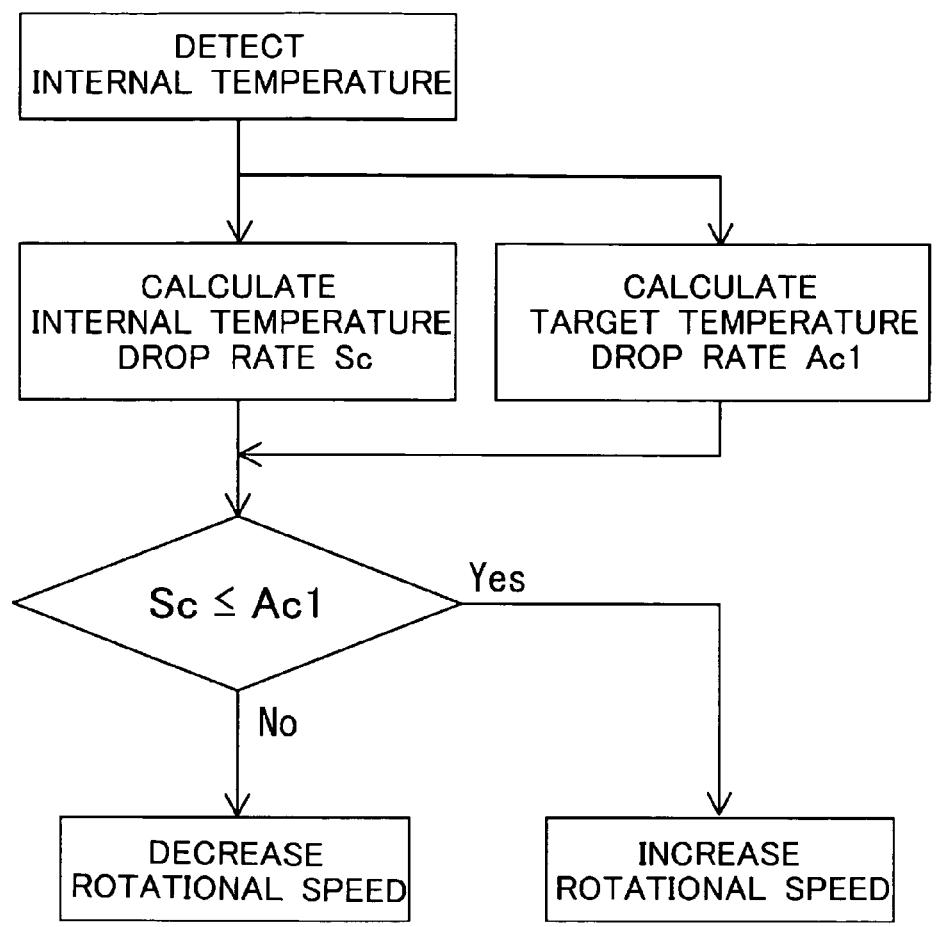
FIG. 12 is a flowchart showing a control operation of the inverter compressor.

FIGS. 11 and 12 show a second embodiment of the present invention.

The difference from the first embodiment is that, as shown in FIG. 11, the ideal temperature curve in the control cooling is formed by a curve line xc1 of a quadratic function (T=f(t)) of temperature and time. As a whole, similar to the straight line xc of the first embodiment, a slow temperature drop is arranged. Note that, in the case of the quadratic function xc1, since the target temperature drop rate is not fixed but is varied depending on the internal temperature, a calculating section that calculates it is provided. More specifically, in the calculating section, at every predetermined sampling time, a target temperature drop rate Ac1 is calculated from the quadratic function xc1 as a temperature drop amount per unit time ($\Delta T/\Delta t$) at the internal temperature (at that moment), and is outputted. Note that the temperature drop rate Ac1 may be found as a differential (dT/dt) of the quadratic function xc1 at the internal temperature.

The other aspects are similar to the first embodiment, including that the rotational speed of the inverter compressor 23 in each of the stages is set so that the adjacent stages have gradually larger differences in rotational speed as the rotational speed is higher.

In the second embodiment, when the internal temperature is dropped to the upper limit temperature Tu, the control cooling is started, and the internal temperature is detected at the every predetermined sampling time. As shown in FIG. 12, at the every sampling time, the actual internal temperature drop rate Sc is calculated based on the detected internal temperature; on the other hand, in the calculating section, the target temperature drop rate Ac1 at the internal temperature at the moment is calculated from the quadratic function xc1. The calculated target value Ac1 is compared with the actual temperature drop rate Sc. When the actual temperature drop rate Sc is equal to or lower than the target value Act, the inverter compressor 23 is accelerated by one stage. Otherwise, the inverter compressor 23 is decelerated by one stage. By repeating this, the control cooling is performed along the ideal curve (the quadratic function curve xc1).

Note that it can be performed likewise also in the freezing compartment 14 side. Furthermore, the ideal temperature curve in the pull-down cooling also may be formed by a quadratic functional curve.

Similar to the first embodiment, the degrees of increase in cooling performance between each of the stages can be equalized independently from the level of the rotational speed of the inverter compressor 23. Therefore, in the case of performing the control to increase or decrease the rotational speed of the inverter compressor 23 stage by stage depends on whether the actual temperature drop rate is higher or lower than the target temperature drop rate, the change amounts in cooling performance that can be substantially equalized, and too high or too low cooling performance does not result (i.e. up-and-down of the cooling speed can be minimized). Thus, the control to drop the internal temperature in accordance with the predetermined cooling characteristic can be stably performed. Besides, since it is necessary only to change the setting of the rotational speeds of the inverter compressor 23, it can be easily realized.

Third Embodiment

Figure 15:
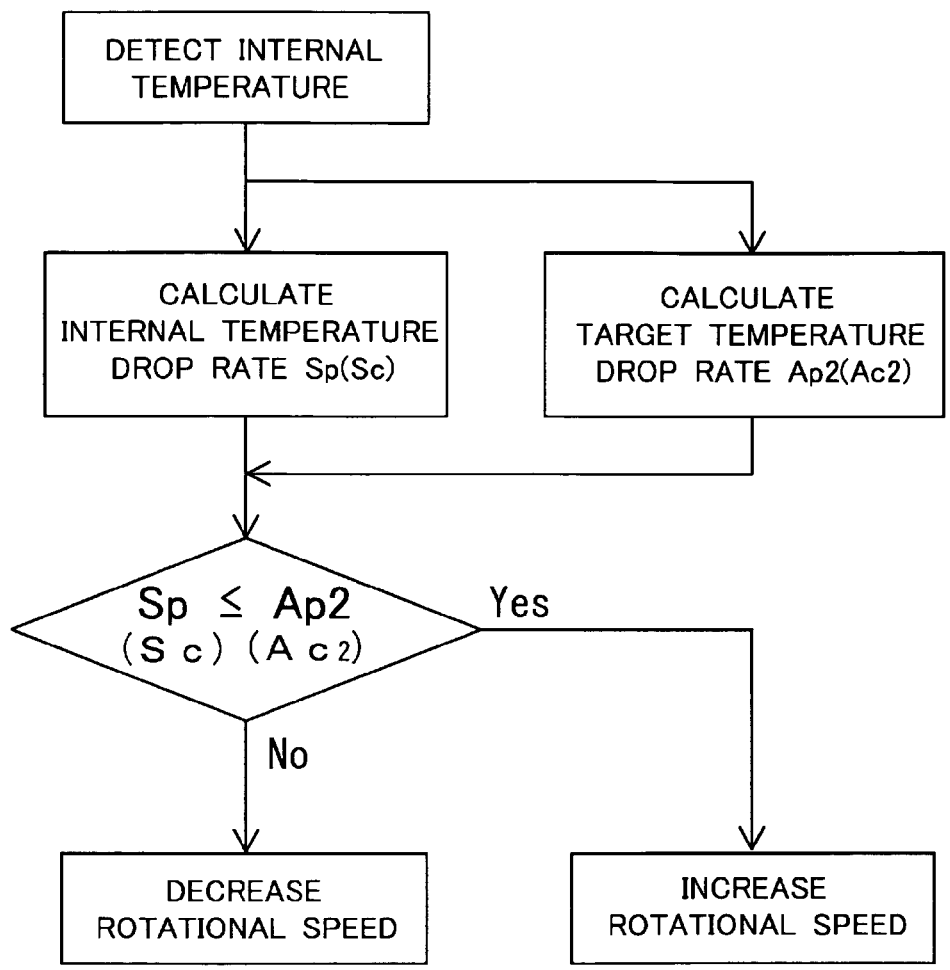
FIG. 15 is a flowchart showing a control operation of the inverter compressor.

FIGS. 13 through 15 show a third embodiment in accordance with the present invention. In the third embodiment, based on the ideal pull-down-cooling characteristic, a target temperature drop rate Ap2 that corresponds to the internal temperature is calculated in advance and, as shown in FIG. 13, a reference table referring the internal temperature to the target temperature drop rate Ap2 is prepared in advance. In addition, based on the ideal control-cooling characteristic, a target temperature drop rate Ac2 is calculated in advance and, as shown in FIG. 14, a reference table referring the internal temperature to the target temperature drop rate Ac2 is prepared in advance. As the internal temperature in the reference table, the temperatures within a control-cooling zone is adopted. Both of the two reference tables are stored in the data storage section 43.

The others are similar to the first embodiment, including that the rotational speed of the inverter compressor 23 in each of the stages is set so that the adjacent stages have gradually larger differences in rotational speed as the rotational speed is higher.

Operations of the third embodiment is as follows. When the pull-down control is started, the internal temperature is detected at every predetermined sampling time. A shown in FIG. 15, at every sampling time, the actual internal temperature drop rate Sp is calculated based on the detected internal temperature. Along with this, the target temperature drop rate Ap2 at the internal temperature (at that moment) is searched through the reference table, and is outputted. The outputted target value Ap2 is compared with the actual temperature drop rate Sp. When the actual temperature drop rate Sp is equal to or lower than the target value Ap2, the inverter compressor 23 is accelerated by one stage. Otherwise, the inverter compressor 23 is decelerated by one stage. By repeating this, the pull-down cooling is performed along the ideal pull-down-cooling characteristic. Thereafter, the control operation is performed.

When the control cooling is started, the internal temperature is detected at every predetermined sampling time. As shown in the same figure, at every sampling time, the actual internal temperature drop rate Sc is calculated based on the detected internal temperature. Along with this, the target temperature drop rate Ac2 at the internal temperature (at that moment) is searched through the reference table, and outputted. The outputted target value Ac2 is compared with the actual temperature drop rate Sc. When the actual temperature drop rate Sc is equal to or lower than the target value Ac2, the inverter compressor 23 is accelerated by one stage. Otherwise, the inverter compressor 23 is decelerated by one stage. By repeating this, the control cooling is performed along the ideal control-cooling characteristic (for example, an approximate quadratic function). Also, it can be performed likewise in the freezing compartment.

Similar to the first and second embodiments, the degrees of increase in cooling performance between the stages each can be equalized. Therefore, in the case of performing the control to increase or decrease the rotational speed of the inverter compressor 23 stage by stage depends on whether the actual temperature drop rate is higher or lower than the target temperature drop rate, the change amounts in cooling performance that can be substantially equalized, and too high or too low cooling performance does not result (i.e. up-and-down of the cooling speed can be minimized). Thus, the control to drop the internal temperature in accordance with the predetermined cooling characteristic can be stably performed. Furthermore, since it is necessary only to change the setting of the rotational speeds of the inverter compressor 23, it can be easily realized.

With this embodiment, it is necessary only to refer to the reference tables in order to obtain the target temperature drop rates Ap2, Ac2, and calculation is unnecessary. Therefore, the control speed can be increased.

Other Embodiments

The present invention is not limited to the embodiments as explained above with reference to the drawings. For example, the following embodiments are also included within the scope of the present invention.

(1) The number of stages of the set speeds of the inverter compressor and the rotational speed in each of the stages is not limited to those illustrated in the above embodiments. The number of stages may be any. The rotational speed should only essentially be such a rotational speed whereby the degrees of increase in cooling performance between the stages each can be equalized.

(2) In the above embodiments, the one that represents the time-varying change mode of the internal temperature is illustrated as the cooling characteristic to follow. This may be another gauge in the cooling device side, for example, the one that represents a time-varying change mode of other physical amount a such as lower pressure or evaporation temperature of coolant.

(3) Furthermore, the physical amount may be the one rising over time inversely proportional to the internal temperature drop.

(4) Furthermore, the present invention can be likewise applied also to a type wherein the internal temperature itself is compared at every sampling time and, based on the comparison, the rotational speed of the inverter compressor is controlled to be increased or decreased stage by stage.

(5) The present invention is not limited to the cases as illustrated in the above embodiments wherein the cooling unit is uniform for refrigerating and freezing. The present invention can be applied also to a case where the cooling unit is for refrigerating use or freezing use only.

The invention claimed is:

1. A method of operating a cooling storage cabinet including a cooling device for internal cooling of the cooling storage cabinet, the cooling device including an inverter compressor, and a rotational speed of the inverter compressor being capable of being changed between a plurality of stages, said method comprising:
prestoring a cooling characteristic as data, the cooling characteristic representing a time-varying change of a predetermined physical amount, the physical amount corresponding to a target time-varying drop of internal temperature;
detecting the physical amount at a plurality of predetermined sampling times; and
changing the rotational speed of the inverter compressor between each of the plurality of stages based on the detected physical amounts at the plurality of predetermined sampling times, said changing the rotational speed of the inverter compressor changes the physical amount in accordance with a target cooling characteristic, wherein the rotational speed of the inverter compressor in each of the plurality of stages is set in a manner that enables the adjacent stages in the plurality of stages to have larger differences in rotational speed as the rotational speed increases.

2. A cooling storage cabinet comprising:
a cooling device including an inverter compressor and an evaporator, said inverter compressor having a rotational speed, which is capable of being changed between each of a plurality of stages;
a storing device configured to store a target cooling characteristic as data, the cooling characteristic representing a time-varying change of a predetermined physical amount, the physical amount corresponding to a time-varying drop of an internal temperature;
a physical amount sensor configured to detect the physical amount;
a physical amount change rate calculating section configured to calculate a change rate of the physical amount at a plurality of predetermined sampling times and based on a signal of said physical amount sensor;
a target physical amount change rate output section configured to output a target change rate based on the cooling characteristic at each sampling time of the plurality of sampling times, the cooling characteristic being stored in said storing device, the target physical amount change rate being a physical amount at one sampling time; and
a comparing section configured to compare an actual physical amount change rate with the target physical amount change rate, the actual physical amount change rate being calculated in said physical amount change rate calculation section, the target physical amount change rate being outputted from said target physical amount change rate output section,
based on a result of the comparison performed by said comparing section, when the actual physical amount change rate is lower than the target physical amount change rate when the rotational speed of said inverter compressor is at one of the plurality of stages, the rotational speed of said inverter compressor is changed so as to be at a stage adjacent to and higher than the one of the plurality of stages, and when the actual physical amount change rate is higher than the target physical amount change rate when the rotational speed of said inverter compressor is at the one of the plurality of stages, the rotational speed of said inverter compressor is changed so as to be at a stage that is adjacent to and lower than the one of the plurality of stages,
wherein the rotational speed of said inverter compressor in each of the plurality of stages is set in a manner that enables adjacent stages in the plurality of stages to have larger differences in rotational speed as the rotational speed becomes higher.

3. The cooling storage cabinet according to claim 2, wherein the cooling characteristic is represented by a linear function of physical amount and time, and said target physical amount change rate output section is configured to output the target physical amount change rate as a fixed value.

4. The cooling storage cabinet according to claim 3, further comprising a plurality of programs, said plurality of programs configured to change the rotational speed of the inverter compressor to change the physical amount in accordance with a predetermined cooling characteristic, wherein each of said plurality of programs differs from each other in the predetermined cooling characteristic, wherein each of said plurality of programs are selectively executably stored in a control device attached to said cooling device.

5. The cooling storage cabinet according to claim 2, wherein the cooling characteristic is represented by a quadratic function of physical amount and time, and said target physical amount change rate output section includes a function configured to perform calculation of the physical amount change rate in the physical amount and output a calculated value as the target physical amount change rate, the calculation being performed at each sampling time of the plurality of sampling times and based on the quadratic function.

6. The cooling storage cabinet according to claim 5, further comprising a plurality of programs, said plurality of programs configured to change the rotational speed of the inverter compressor to change the physical amount in accordance with a predetermined cooling characteristic, wherein each of said plurality of programs differs from each other in the predetermined cooling characteristic, wherein each of said plurality of programs are selectively executably stored in a control device attached to said cooling device.

7. The cooling storage cabinet according to claim 2, wherein a predetermined reference table based on the cooling characteristic refers the physical amount to the target physical amount change rate, wherein said target physical amount change rate output section includes a function configured to search and output the target physical amount change rate that corresponds to the physical amount through the predetermined reference table.

8. The cooling storage cabinet according to claim 7, further comprising a plurality of programs, said plurality of programs configured to change the rotational speed of the inverter compressor to change the physical amount in accordance with a predetermined cooling characteristic, wherein each of said plurality of programs differs from each other in the predetermined cooling characteristic, wherein each of said plurality of programs are selectively executably stored in a control device attached to said cooling device.

9. The cooling storage cabinet according to claim 2, further comprising a plurality of programs, said plurality of programs configured to change the rotational speed of the inverter compressor to change the physical amount in accordance with a predetermined cooling characteristic, wherein each of said plurality of programs differs from each other in the predetermined cooling characteristic, wherein each of said plurality of programs are selectively executably stored in a control device attached to said cooling device.

* * * * *